US006546115B1

(12) United States Patent
Ito et al.

(10) Patent No.: US 6,546,115 B1
(45) Date of Patent: Apr. 8, 2003

(54) METHOD OF UPDATING REFERENCE BACKGROUND IMAGE, METHOD OF DETECTING ENTERING OBJECTS AND SYSTEM FOR DETECTING ENTERING OBJECTS USING THE METHODS

(75) Inventors: Wataru Ito, Kodaira (JP); Hiromasa Yamada, Kodaira (JP); Hirotada Ueda, Kokubunji (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/392,622

(22) Filed: Sep. 9, 1999

(30) Foreign Application Priority Data

Sep. 10, 1998 (JP) .......................................... 10-256963

(51) Int. Cl.[7] ................................................. G06K 9/00

(52) U.S. Cl. ...................................... 382/100; 348/169

(58) Field of Search ................................ 382/100, 103, 382/155, 181, 190, 209, 134, 169, 700, 454; 356/364

(56) References Cited

U.S. PATENT DOCUMENTS 5,748,775 A * 5/1998 Tsuchikawa et al. ........ 382/190
6,061,088 A * 5/2000 Khosravi et al. ........... 348/169
6,104,438 A * 8/2000 Saito .......................... 348/587

OTHER PUBLICATIONS

JP–A–11–175735 published on Jul. 2, 1999.
JP–A–9–73541 (corres. to U.S. Ser. No. 08/646,018 filed on May 7, 1996).
JP–A–11–127430 published on May 11, 1999.
H. Ohta et al. "A Human Detector Based on Flexible Pattern Matching of Silhouette Projection" MVA '94 IAPR Workshop on Machine Vision Applications, Dec. 13–15, 1994.

* cited by examiner

*Primary Examiner*—Jayanti K. Patel
*Assistant Examiner*—Seyed Azarian
(74) *Attorney, Agent, or Firm*—Antonelli, Terry, Stout & Kraus, LLP

(57) ABSTRACT

A method of updating a reference background image used for detecting objects entering an image pickup view field based on the binary image generated from the difference between an input image and the reference background image of the input image. The image pickup view field is divided into a plurality of view field areas, and a reference background image corresponding to each of the fixed divided view field areas is updated. An entering object detection apparatus using this method has an input image processing unit including an image memory storing an input image from an image input unit, a program memory storing the program for activating the entering object detecting unit, a work memory and a central processing unit activating the entering object detecting unit in accordance with the program. The processing unit has an entering object detecting unit determining intensity difference for each pixel between the input image and the reference background image not including an entering object to be detected and detecting an area with the difference larger than a predetermined threshold as an entering object, a dividing unit dividing the image pickup view field of the image input unit into a plurality of view field areas, an image change detecting unit detecting the change of the image in each of the divided view field areas, and a reference background image updating unit updating each portion of the reference background image corresponding to each of the divided view field areas associated with the portion of the input image free of the image change, wherein the entering object detecting unit detects entering objects based on the updated reference background image.

22 Claims, 11 Drawing Sheets

METHOD OF UPDATING REFERENCE BACKGROUND IMAGE, METHOD OF DETECTING ENTERING OBJECTS AND SYSTEM FOR DETECTING ENTERING OBJECTS USING THE METHODS

BACKGROUND OF THE INVENTION

The present invention relates to a monitoring system, or more in particular to an entering object detecting method and an entering object detecting system for automatically detecting persons who have entered the image pickup view field or vehicles moving in the image pickup view field from an image signal.

An image monitoring system using an image pickup device such as a camera has conventionally been widely used. In recent years, however, demand has arisen for an object tracking and monitoring apparatus for an image monitoring system by which objects such as persons or automobiles (vehicles) entering the monitoring view field are detected from an input image signal and predetermined information or alarm is produced automatically without any person viewing the image displayed on a monitor.

For realizing the object tracking and monitoring system described above, the input image obtained from an image pickup device is compared with a reference background image, i.e. an image not including an entering object to be detected thereby to detect a difference in intensity (or brightness) value for each pixel, and an area with a large intensity difference is detected as an entering object. This method is called a subtraction method and has found wide applications.

In this method, however, a reference background image not including an entering object to be detected is required, and in the case where the brightness (intensity value) of the input image changes due to the illuminance change in the monitoring view field, for example, the reference background image is required to be updated in accordance with the illuminance change.

Several methods are available for updating a reference background image. They include a method for producing a reference background using an average value of the intensity for each pixel of input images in a plurality of frames (called the averaging method), a method for sequentially producing a new reference background image from the weighted average of the present input image and the present reference background image, calculated under a predetermined weight (called the add-up method), a method in which the median value (central value) of temporal change of the intensity of a given pixel having an input image is determined as a background pixel intensity value of the pixel and this process is executed for all the pixels in a monitoring area (called the median method), and a method in which the reference background image is updated for pixels other than in the area entered by an object and detected by the subtraction method (called the dynamic area updating method).

In the averaging method, the add-up method and the median method, however, many frames are required for producing a reference background image, and a long time lag occurs before complete updating of the reference background image after an input image change, if any. In addition, an image storage memory of a large capacity is required for an object tracking and monitoring system. In the dynamic area updating method, on the other hand, a intensity mismatch occurs in the boundary between pixels with the reference background image updated and pixels with the reference background image not updated in the monitoring view field. Here, the mismatch refers to a phenomenon that it falsely looks as if a contour exists at a portion where the background image has in fact a smooth change in intensity due to generation of a stepwise intensity change at an interface between updated pixels and those not updated. For specifying the position where the mismatch has occurred, the past images of detected entering objects are required to be stored, so that an image storage memory of a large capacity is required for the object tracking and monitoring system.

SUMMARY OF THE INVENTION

An object of the present invention is to obviate the disadvantages described above and to provide a highly reliable method and a highly reliable system for updating a background image.

Another object of the invention is to provide a method and a system capable of rapidly updating the background image in accordance with the brightness or intensity (intensity value) change of an input image using an image memory of a small capacity.

Still another object of the invention is to provide a method and a system for updating the background image in which an intensity mismatch which may occur between the pixels updated and the pixels not updated of the reference background image has no effect on the reliability for detection of an entering object.

A further object of the invention is to provide a method and a system for detecting entering objects high in detection reliability.

In order to achieve the objects described above, according to one aspect of the invention, there is provided a reference background image updating method in which the image pickup view field is divided into a plurality of areas and the portion of the reference background corresponding to each divided area is updated.

The image pickup view field may be divided and the reference background image for each divided area may be updated after detecting an entering object. Alternatively, after dividing the image pickup view field, an entering object may be detected for each divided view field and the corresponding portion of the reference background image may be updated.

Each portion of the reference background image is updated in the case where no change indicating an entering object exists in the corresponding input image from an image pickup device.

Preferably, the image pickup view field is divided by one or a plurality of boundary lines substantially parallel to the direction of movement of an entering object.

Preferably, the image pickup view field is divided by an average movement range of an entering object during each predetermined unit time.

Preferably, the image pickup view field is divided by one or a plurality of boundary lines substantially parallel to the direction of movement of an entering object and the divided view field is subdivided by an average movement range of an entering object during each predetermined unit time.

According to an embodiment, the entering object includes an automobile, the input image includes a vehicle lane, and preferably, the image pickup view field is divided by one or a plurality of lane boundaries.

According to another embodiment, the entering object is an automobile, the input image includes a lane, and preferably, the image pickup view field is divided by an average movement range of the automobile during each predetermined unit time.

According to still another embodiment, the entering object is an automobile, the input image includes a lane, and preferably the image pickup view field is divided by one or a plurality of lane boundaries, and the divided image pickup view field is subdivided by an average movement range of the automobile during each predetermined unit time.

According to a further embodiment, the reference background image can be updated within a shorter time using the update rate of 1/4, for example, than by the add-up method generally using the lower update rate of 1/64.

According to another aspect of the invention, there is provided a reference background image updating system used for detection of entering objects in the image pickup view field based on a binarized image generated from the difference between an input image and and the reference background image of the input image, comprising a dividing unit for dividing the image pickup view field into a plurality of view areas and an update unit for updating the reference background image corresponding to each of the divided view fields independently for each of the divided view fields.

According to still another aspect of the invention, there is provided an entering object detecting system comprising an image input unit, a processing unit for processing the input image including an image memory for storing an input image from the image input unit, a program memory for storing the program for the operating the entering object detecting system and a central processing unit for activating the entering object detecting system in accordance with the program, wherein the processing unit includes an entering object detecting unit for determining the intensity difference for each pixel between the input image from the image input unit and the reference background image not including the entering object to be detected and detecting the binarized image generated from the difference value, i.e. detecting the area where the difference value is larger than a predetermined threshold as an entering object, a dividing unit for dividing the image pickup view field of the image input unit into a plurality of view field areas, an image change detecting unit for detecting the image change in each divided view field area, and a reference background image update unit for updating each portion of the reference background image corresponding to the divided view field area associated with to the portion of the input image having no image change, wherein the entering object detecting unit detects an entering object based on the updated reference background image.

DESCRIPTION OF THE EMBODIMENTS

Figure 7:
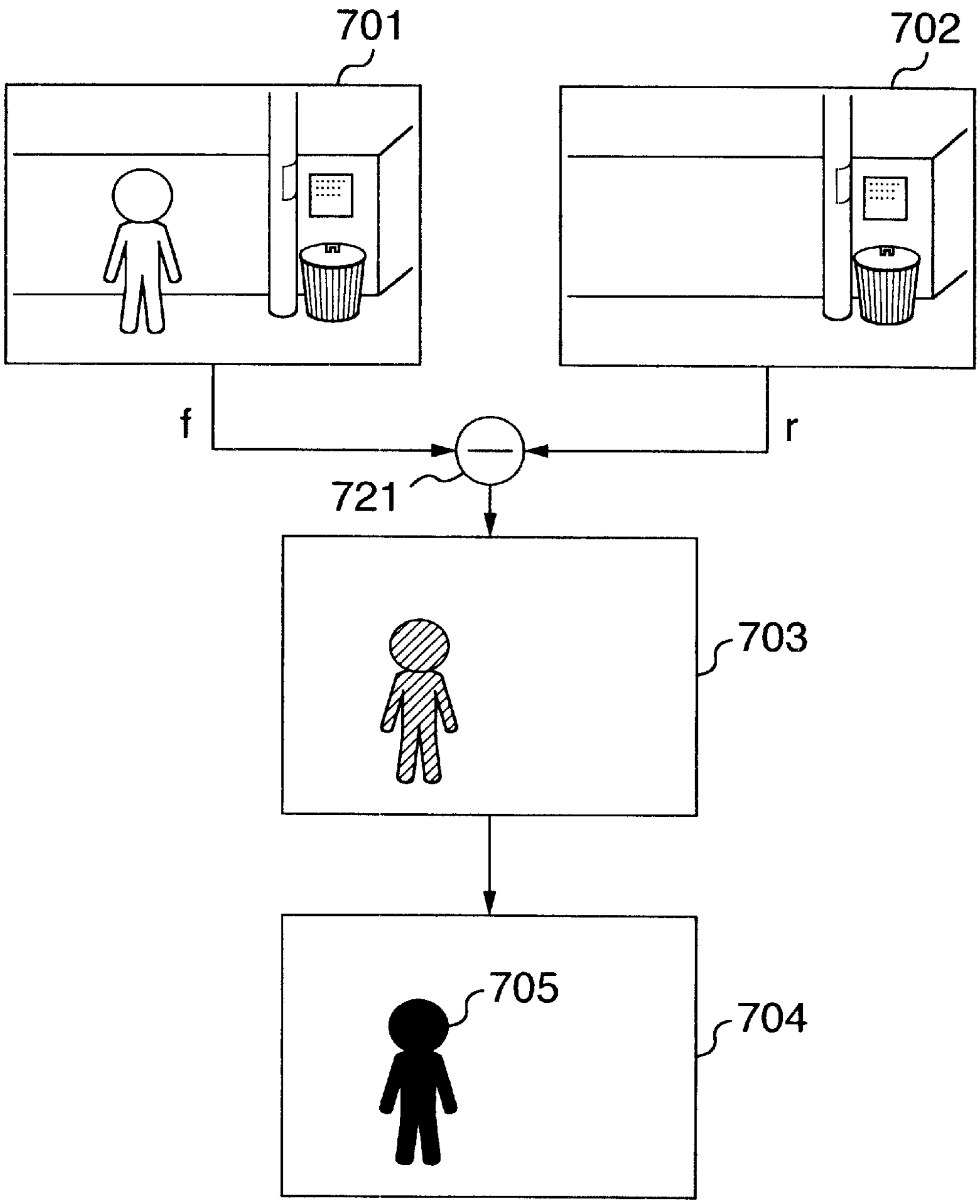
FIG. 7 is a diagram for explaining the principle of object detection by the subtraction method.

First, the processing by the subtraction method will be explained with reference to FIG. 7. FIG. 7 is a diagram for explaining the principle of object detection by the subtraction method, in which reference numeral 701 designates an input image f, numeral 702 a reference background image r, numeral 703 a difference image, numeral 704 a binarized image, numeral 705 an image of an object detected by the subtraction method and numeral 721 a subtractor. In FIG. 7, the subtractor 721 produces the difference image 703 by calculating the intensity difference for each pixel between the input image 701 and the reference background image 702 prepared in advance. Then, the intensity of the pixels of the difference image 703 less than a predetermined threshold is defined as "0" and the intensity of the pixels not less than the threshold as "255" (the brightness of each pixel is calculated in 8 bits) thereby to produce the binarized image 704. As a result, the human object included in the input image 701 is detected as an image 705 in the binarized image 704. The reference background image is a background image not including any entering object to be detected. In the case where the intensity (intensity or brightness value) of the input image changes due to the change in illuminance or the like in the monitoring area, the reference background image is required to be updated in accordance with the illuminance change. The methods for updating the reference background image, namely, the averaging method, the add-up method, the median method and the dynamic area updating method will be briefly explained below.

First, the averaging method will be explained. This method averages images of a predetermined number of frames pixel by pixel to generate an updated background image. In this method, however, in order to obtain an accurate background image, it is necessary that the number of the frames to be used for averaging may be quite large, for example, 60 (corresponding to the period of 10 seconds supposing 6 frames per second). Therefore a large time lag (about 10 seconds) is unfavorably generated between the time at which images for reference background image generation are inputted and the time at which subtraction processing for object detection is executed. Due to this time lag, a problem arises such that it becomes impossible to obtain a reference background image which is accurate enough to be usable as a current background image for object detection in such cases as when the brightness of the imaging view field suddenly changes when the sun is quickly blocked by clouds or when the sun is quickly getting out of the clouds.

Figure 8:
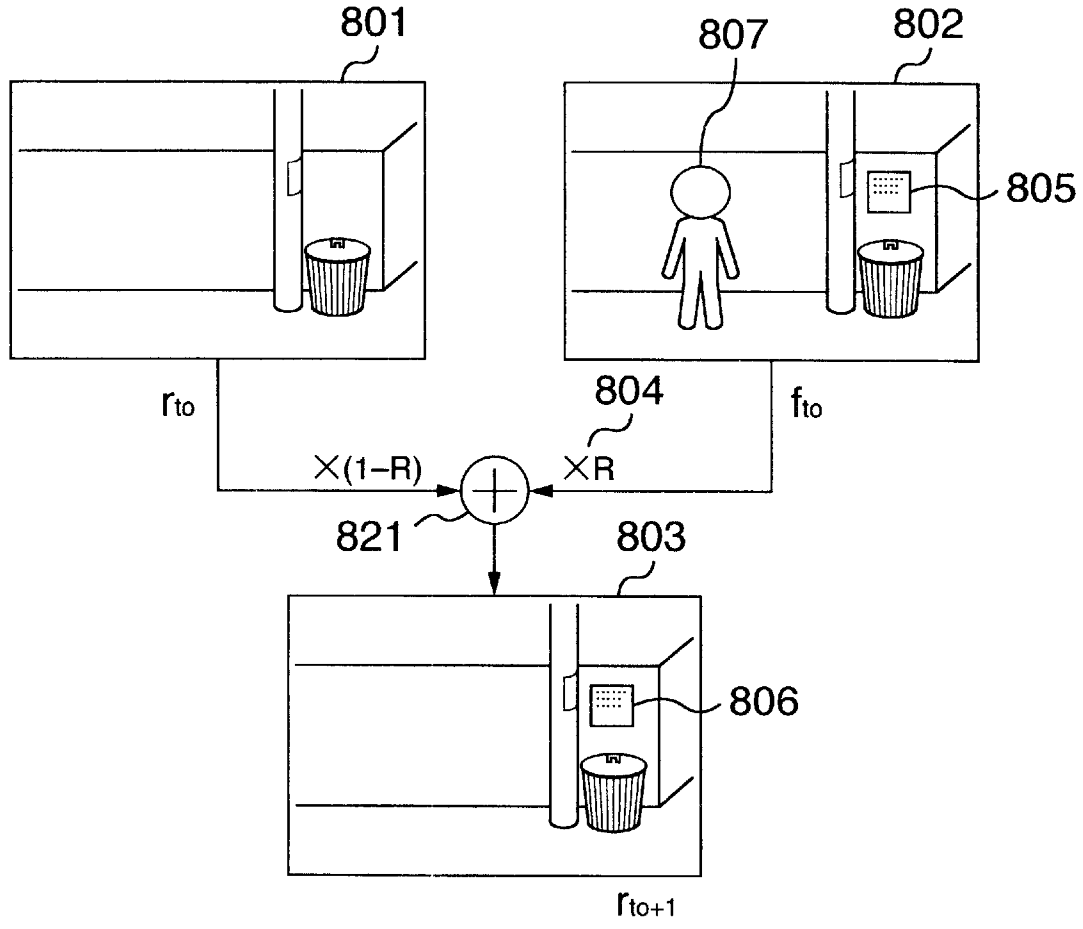
FIG. 8 is a diagram for explaining the principle of updating a reference background image by the add-up method.

Next, the add-up method will be explained with reference to FIG. 8. FIG. 8 is a diagram for explaining a method of updating the reference background image using the add-up method, in which numeral 801 designates a reference background image, numeral 802 an input image, numeral 803 a reference background image, numeral 804 an update rate, numerals 805, 806 posters, numeral 807 an entering object, and numeral 821 is a weighted average calculator. In the add-up method, the weighted average of the present reference background image 801 is calculated with a predetermined weight (update rate 804) imposed on the present input image 802 thereby to produce a new reference background image 803 sequentially. This process is expressed by equation (1) below.

$$r_{t0+1}(x, y)=(1-R)\times r_{t0}+R\times f_{t0}(x, y) \tag{1}$$

where $r_{t0+1}$ is a new reference background image 803 used at time point $t_0+1$, $r_{t0}$ a reference background image 801 at time point $t_0$, $f_{t0}$ an input image 802 at time point $t_0$ and R an update rate 804. Also, (x, y) is a coordinate indicating the pixel position. In the case where the background has changed such as by attaching the poster 805 anew in the input image 802, for example, the reference background image is updated in the new reference background image 803 such as by the poster 806. When the update rate 804 is increased, the reference background image 803 is also updated within a short time against the background change of the input image 802. In the case where the update rate 804 is set to a large value, however, the image of an entering object 807, if any is present in the input image, is absorbed into the new reference background image 803 in the input image. Therefore, the update rate 805 is required to be empirically set to a value (1/64, 1/32, 3/64, etc. for example) at which the image of the entering object 807 is not absorbed into the new reference background image 803. In the case where the update rate is set to 1/64, for example, it is equivalent to producing the reference background image by the averaging method using the average intensity value of an input image of 64 frames for each pixel. In the case where the update rate is set to 1/64, however, the update process for 64 frames is required from the time of occurrence of a change in the input image to the time when the change is entirely reflected in the reference background image. This means that the time as long as ten and several seconds is required before complete updating in view of the normal fact that about five frames are used per second for detecting an entering object. An example of the object recognition system using the add-up method described above is disclosed in JP-A-11-175735 published on Jul. 2, 1999 (Japanese Patent Application No. 9-344912, filed Dec. 15, 1997).

Figure 9:
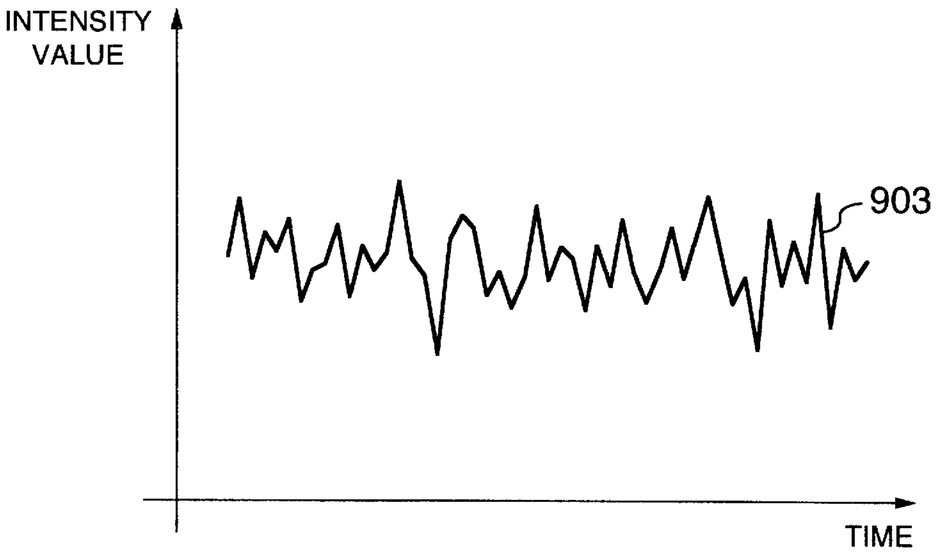
FIG. 9 is a diagram for explaining the intensity change of a given pixel over N frames.
Figure 10:
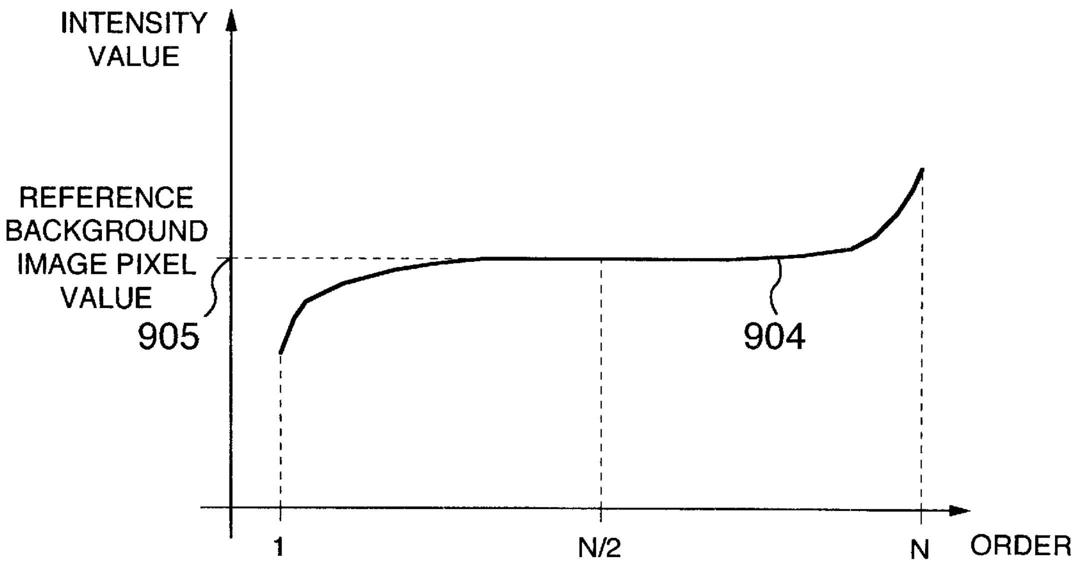
FIG. 10 is a diagram for explaining the principle of updating the reference background image by the median method.

Now, the median method will be explained with reference to FIGS. 9 and 10. FIG. 9 is a graph indicating the intensity value with time of an input image of predetermined N frames (N: natural number) for a given pixel, in which the horizontal axis represents the time and the vertical axis the intensity value, and numeral 903 designates the intensity value data of the input image of N frames arranged in temporal order. FIG. 10 is a diagram in which the intensity data obtained in FIG. 9 are arranged in the order of magnitude along the time axis, in which the horizontal axis represents the number of frames and the vertical axis the intensity value, numeral 904 the intensity value data with the intensity value arranged in the ascending order of magnitude and numeral 905 the median value.

In the median method, as shown in FIG. 9, the intensity data 903 is obtained from an input image for the same pixel of predetermined N frames. Then, as shown in FIG. 10, the intensity data 903 are arranged in the ascending order to produce the intensity data 904, so that the intensity value 905 for N/2 (median value) is defined as the intensity of a reference background pixel. This process is executed for all the pixels in the monitoring area. This method is expressed as $$r_{t0+1}(x, y)=\mathrm{med}\{f_t(x, y)\}t_0 \leqq t < t_0-N \tag{2}$$

where $r_{t0+1}$ is a new reference background image 905 used at time point $t_0+1$, $R_{t0}$ a reference background image at time point $t_0$, $f_{t0}$an input image at time point $t_0$, and med { } the median calculation process. Also, (x, y) is the coordinate indicating the pixel position. Further, the number of frames required for the background image production is set to about not less than twice the number of frames in which an entering object of standard size to be detected passes one pixel. In the case where an entering object passes a pixel in ten frames, for example, N is set to 20. The intensity value, which is arranged in the ascending order of magnitude in the example of the median method described above, can alternatively be arranged in the descending order.

The median method has the advantage that the number of frames of the input image required for updating the reference background image can be reduced.

Nevertheless, as many image memories as N frames are required, and the brightness values are required to be rearranged in the ascending or descending order for median calculations. Therefore, the calculation cost and the calculation time are increased. An example of an object detecting system using the median method described above is disclosed in JP-A-9-73541 (corresponding to U.S. Ser. No. 08/646018 filed on May 7, 1996 and EP 96303303.3 filed on May 13, 1996).

Finally, the dynamic area updating method will be explained. This method, in which the entering object area 705 is detected by the subtraction method as shown in FIG. 7, and the reference background image 702 is updated by the add-up method for the pixels other than the detected entering object area 705, is expressed by equation (3) below.

$$\exists(x, y)\in\{(x, y)|d_{t0}(x, y)=0\}r_{t0+1}(x, y)=(1-R')\times r_{t0}+R'\times f_{t0}(x, y) \tag{3}$$

where $d_{t0}$ is a detected entering object image 704 at time point $t_0$, and the intensity value of the pixels having the entering object therein are set to 255 and the intensity values of other pixels are set to 0. Also, $r_{t0+1}$ indicates a new reference background image 803 used at time point $t_0+1$, $r_{t0}$ a reference background image 801 at time point $t_0$, $f_{t0}$ an input image 802 at time point $t_0$, and R' an update rate 804. Further, (x, y) represents the coordinate indicating the position of a given pixel.

In this dynamic area updating method, the update rate R' can be increased as compared with the update rate R for the add-up method described above. As compared with the add-up method, therefore, the time can be shortened from when the input image undergoes a change until when the change is updated in the reference background image. In this method, however, updated pixels coexist with pixels not updated in the reference background image, and therefore in the case where the illuminance changes in the view field, the mismatch of the intensity value is caused.

Assume, for example, that the intensity value A of the pixel a changes to the intensity value A' and the intensity value B of an adjacent pixel b changes to the intensity value B'. The pixel a having no entering object is updated toward the intensity value A' following the particular change. With the pixel b having the entering object, however, the intensity value is not updated and remains at B. In the event that adjacent two pixels a and b have substantially the same intensity value, therefore, the presence of a pixel updated and a pixel not updated as in the above-mentioned case causes the mismatch of the intensity value.

This mismatch is developed in the boundary portion of the entering object area 705. Also, this mismatch remains unremoved until the complete updating of the reference background image after the entering object passes. Even after the passage of the entering object, therefore, the mismatch of the intensity value remains unremoved, thereby leading to the inaccuracy of detection of a new entering object. For preventing this inconvenience, i.e. for specifying the point of mismatch to update the reference background image sequentially, it is necessary to hold as many detected entering object images as the frames required for updating the reference background image.

An example of an object detecting system using the dynamic area updating method described above is disclosed in JP-A-11-127430 published on May 11, 1999 (Japanese Patent Application No. 9-291910 filed on Oct. 24, 1997).

Now, embodiments of the present invention will be described with reference to the drawings.

Figure 6:
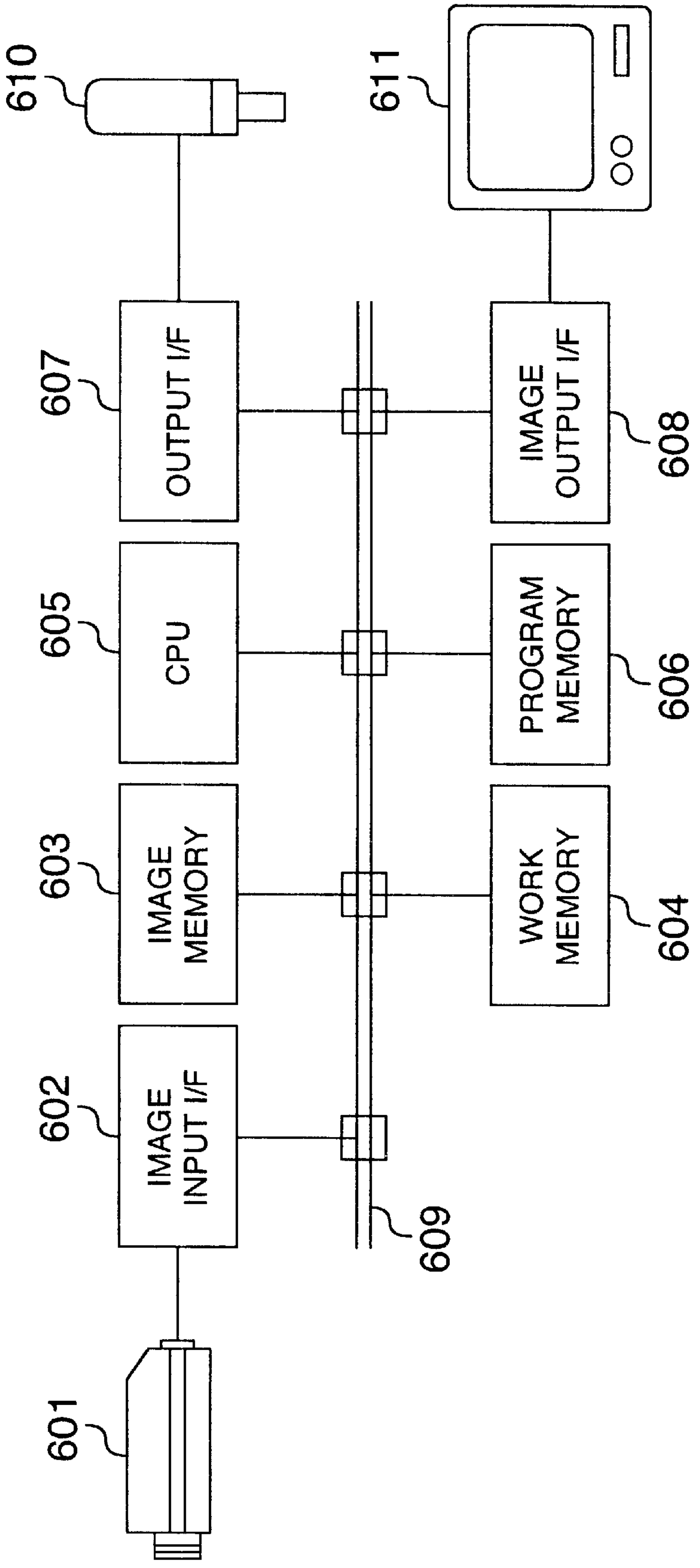
FIG. 6 is a block diagram showing a hardware configuration according to an embodiment of the invention.

A configuration of an object tracking and monitoring system according to an embodiment will be explained. FIG. 6 is a block diagram showing an example of a hardware configuration of an object tracking and monitoring system. In FIG. 6, numeral 601 designates an image pickup device such as a television (TV) camera, numeral 602 an image input interface (I/F), numeral 609 a data bus, numeral 603 an image memory, numeral 604 a work memory, numeral 605 a CPU, numeral 606 a program memory, numeral 607 an output interface (I/F), numeral 608 an image output I/F, numeral 610 an alarm lamp, and numeral 611 a surveillance monitor. The TV camera 601 is connected to the image input I/F 602, the alarm lamp 610 is connected to the output I/F 607, and the monitor 611 is connected to the image output I/F 608. The image input I/F 602, the image memory 603, the work memory 604, the CPU 605, the program memory 606, the output I/F 607 and the image output I/F 608 are connected to the data bus 609. In FIG. 6, the TV camera 601 picks up an image in the image pickup view field including the area to be monitored. The TV camera 601 converts the image thus picked up into an image signal. This image signal is input to the image input I/F 602. The image input I/F 602 converts the input image signal into a format for processing in the object tracking system, and sends it to the image memory 603 through the data bus 609. The image memory 603 stores the image data sent thereto. The CPU 605 analyzes the images stored in the image memory 603 through the work memory 604 in accordance with the program held in the program memory 606. As a result of this analysis, information is obtained as to whether an object has entered a predetermined monitoring area (for example, the neighborhood of a gate along a road included in the image pickup view field) in the image pickup view field of the TV camera. The CPU 605 turns on the alarm lamp 610 through the output I/F 607 from the data bus 609 in accordance with the processing result, and displays an image of the processing result, for example, on the monitor 611 through the image output I/F 608. The output I/F 607 converts the signal from the CPU 605 into a format usable by the alarm lamp 610, and sends it to the alarm lamp 610. The image output I/F 608 converts the signal from the CPU 605 into a format usable by the monitor 611, and sends it to the alarm lamp 610. The monitor 611 displays an image indicating the result of detecting an entering object. The image memory 603, the CPU 605, the work memory 604 and the program memory 606 make up an input image processing unit. All the flowcharts below will be explained with reference to an example of the hardware configuration of the object tracking and monitoring system described above.

Figure 1:
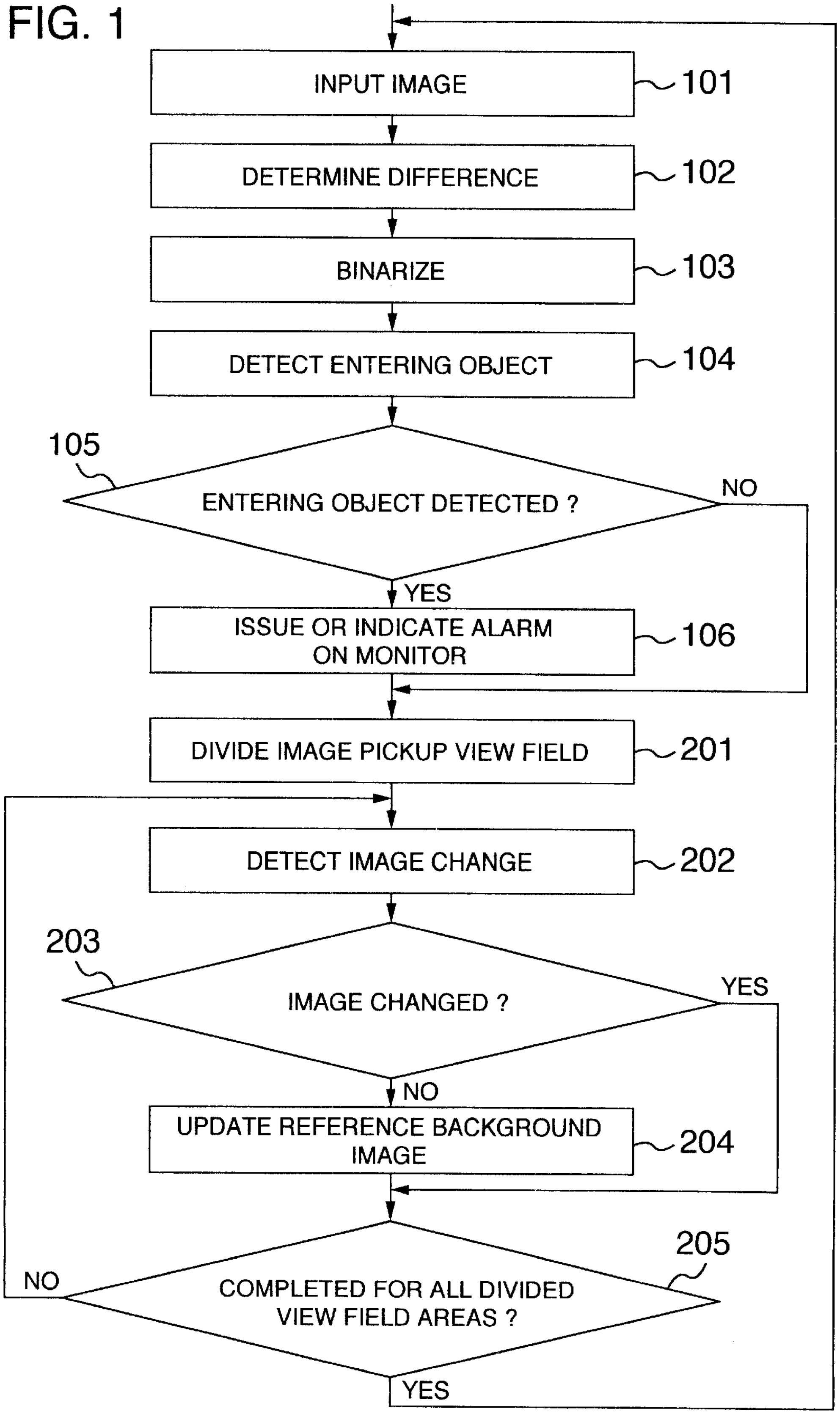
FIG. 1 is a flowchart for explaining the process of updating a reference background image and executing the process for detecting an entering object according to an embodiment of the invention.

FIG. 1 is a flowchart for explaining the process of updating the reference background image and detecting an entering object according to an embodiment of the invention. The process of steps 101 to 106 in the flowchart of FIG. 1 will be explained below with reference to FIG. 7 which has been used for explaining the prior art.

At time point $t_0$, an input image 701 shown in FIG. 7 corresponding to 320×240 pixels is produced from a TV camera 601 (image input step 101). Then, the difference in intensity for each pixel between the input image 701 and the reference background image 702 stored in the image memory 603 is calculated by a subtractor 721 thereby to produce a difference image 703 (difference processing step 102). The difference image 703 is processed with a threshold. Specifically, the intensity value of a pixel not less than a preset threshold value is converted into "255" so that the particular pixel is set as a portion where a detected object exists, while the intensity value less than the threshold value is converted into "0" si that the particular pixel is defined as a portion where no detected object exists, thereby producing a binarized image 704 (binarization processing step 103). The preset threshold value is the one for determining the presence or absence of an entering object with respect to the difference value between the input image and the reference background image and set at such a value that the entering object is not buried in a noise or the like as a result of binarization. This value is dependent on the object to be monitored and set experimentally. According to an example of the embodiment of the invention, the threshold value is set to 20. As an alternative, the threshold value may be varied in accordance with the difference image 703 obtained by the difference processing.

Further, a mass of area 705 where the brightness value is "255" is extracted by the well-known labeling method and detected as an entering object (entering object detection processing step 104). In the case where no entering object is detected in the entering object detection processing step 104, the process jumps to the view field dividing step 201. In the case where there is an entering object detected, on the other hand, the process proceeds to the alarm/monitor indication step 106 (alarm/monitor branching step 105). In the alarm/monitor indication step 106, the alarm lamp 610 is turned on or the result of the entering object detection process is indicated on the monitor 611. The alarm/monitor indication step 106 is followed also by the view field dividing step 201. Means for transmitting an alarm as to the presence or absence of an entering object to the guardsman (or an assisting living creature, which may be the guardsman himself, in charge of transmitting information to the guardsman) may be any device using light, electromagnetic wave, static electricity, sound, vibrations or pressure which is adapted to transmit an alarm from outside of the physical body of the guardsman through any of his sense organs such as aural, visual and tactile ones, or other means giving rise to an excitement in the body of the guardsman.

Now, the process of steps 201 to 205 in the flowchart of FIG. 1 will be explained with reference to FIGS. 5, 7 and 8.

In the view field dividing step 201, the view field is divided into a plurality of view field areas, and the process proceeds to the image change detection step 202. Specifically, the process of steps 202 to 205 is repeated for each divided view field area.

In the view field dividing step 201, division of the view field is previously determined based on, for example, an average moving distance of an entering object, a moving direction thereof, for example, parallel to the moving direction (for example, traffic lanes when the entering object is a vehicle) or perpendicular thereto, a staying time of an entering object or the like. Other than these, by setting dividing border lines to border portions existing in the monitoring view field (for example, a median strip, a median line, a border line between roadway and sidewalk or the like when a moving object is a vehicle moving on a road), it becomes possible to make mismatching portions between those pixels of the reference background image that are updated and those not updated harmless. Other than those dividing portions mentioned above, the view field may be divided at any portions that may possibly cause intensity mismatching such as wall, fence, hedge, river, waterway, curb, bridge, pier, handrail, railing, cliff, plumbing, window frame, counter in a lobby, partition, apparatuses such as ATM terminals, etc.

The process from the image change detection step 202 to the divided view field end determination step 205 is executed for each of the plurality of divided view field areas. Specifically, the process of steps 202 to 205 is repeated for each divided view field area. First, in the image change detection step 202, a changed area existing in the input image is detected for each divided view field area independently. FIG. 5 is a diagram for explaining an example of the method of processing the image change detection step 202. In FIG. 5, numeral 1001 designates an input image at time point $t_0-2$, numeral 1002 an input image at time point $t_0-1$, numeral 1003 an input image at time point $t_0$, numeral 1004 a binarized difference image obtained by determining the difference between the input image 1002 and the input image 1003 and binarizing the difference, numeral 1005 a binarized difference image obtained by determining the difference between the input image 1003 and the input image 1002 and binarizing the difference, numeral 1006 a changed area image, numeral 1007 an entering object detection area of the input image 1001 at time point $t_0-2$, numeral 1008 an entering object detection area of the input image 1002 at time point $t_0-1$, numeral 1009 an entering object detection area of the input image 1003 at time point $t_0$, numeral 1010 a detection area of the binarized difference image 1004, numeral 1011 a detection area of the binarized difference image 1005, numeral 1012 a changed area, numerals 1021, 1022 difference binarizers, and numeral 1023 a logical product calculator.

Figure 5:
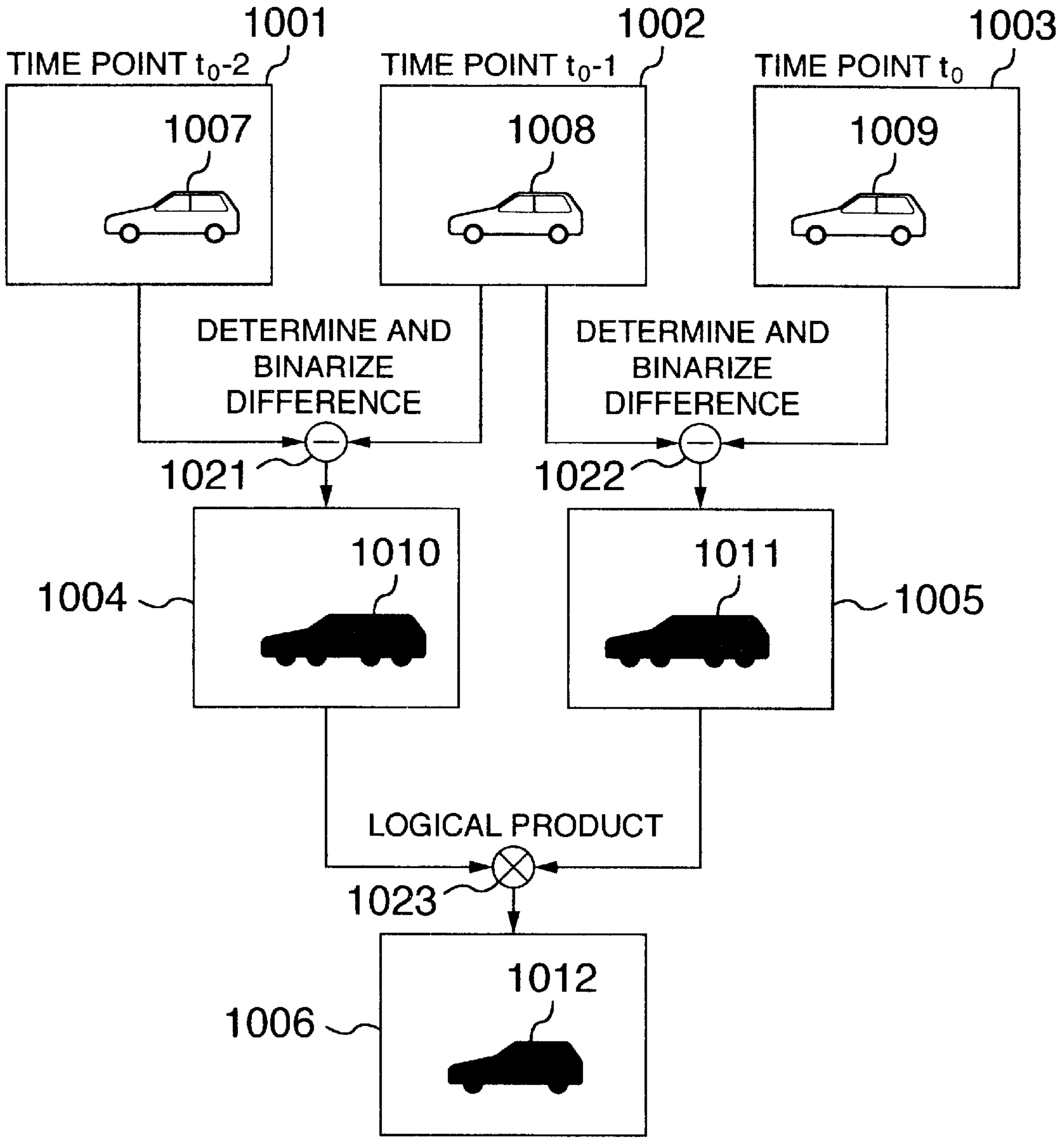
FIG. 5 is a diagram for explaining an example of an image change detecting method.

In FIG. 5, entering objects existing in the input image 1001 at time point $t_0-2$, the input image 1002 at time point $t_0-1$ and the input image 1003 at time point to are indicated as a model, and each entering object proceeds from right to left in the image. This image change detection method regards time point $t_0$ as the present time and uses input images of three frames including the input image 1001 at time pint $t_0-2$, the input image 1002 at time point $t_0-1$ and the input image 1003 at time point $t_0$ stored in the image memory 603.

In the image change detection step 202, the difference binarizer 1021 calculates the difference of the intensity or brightness value for each pixel between the input image 1001 at time point $t_0-2$ and the input image 1002 at time point $t_0-1$, and binarizes the difference in such a manner that the intensity or brightness value of the pixels for which the difference is not less than a predetermined threshold level (20, for example, in this embodiment) is set to "255", while the intensity value of the pixels less than the predetermined threshold level is set to "0". As a result, the binarized difference image 1004 is produced. In this binarized difference image 1004, the entering object 1007 existing in the input image 1001 at time point $t_0-2$ is overlapped with the entering object 1008 existing in the input image 1002 at time point $t_0-1$, and the resulting object is detected as the area (object) 1010. In similar fashion, the difference between the input image 1002 at time point $t_0-1$ and the input image 1003 at time point $t_0$ is determined by the difference binarizer 1022 and binarized with respect to the threshold level to produce the binarized difference image 1005. In this binarized difference image 1005, the entering object 1008 existing in the input image 1002 at time point $t_0-1$ is overlapped with the entering object 1009 existing in the input image 1003 at time point $t_0$, and the resulting object is detected as the area (object) 1011.

Then, the logical product calculator 1023 calculates the logical product of the binarized difference images 1004, 1005 for each pixel thereby to produce the changed area image 1006. The entering object 1008 existing at time point $t_0-1$ is detected as a changed area (object) 1012 in the changed area image 1006. As described above, the changed area 1012 with the input image 1002 changed by the presence of the entering object 1008 is detected in the image change detection step 202.

In FIG. 5, a vehicle enters or moves, and this entering or moving vehicle is produced as the changed area 1012.

The image change detection method described with reference to FIG. 5 is disclosed in H. Ohata et al. "A Human Detector Based on Flexible Pattern Matching of Silhouette Projection" MVA '94 IAPR Workshop on Machine Vision Applications Dec. 13–15, 1994, Kawasaki, the disclosure of which is hereby incorporated by reference.

At the end of the image change detection step 202, the input image 1002 at time point $t_0-1$ is copied in the area for storing the input image 1001 at time point $t_0-2$ in the image memory 603, and the input image 1003 at time point $t_0$ is copied in the area for storing the input image 1002 at time point $t_0-1$ in the image memory 603 thereby to replace the information in the storage area in preparation for the next process. After that, the process proceeds to the division update process branching step 203.

As described above, the image change between time points at which the input images of three frames are obtained can be detected from these input images in the image change detection step 202. As far as a temporal image change can be obtained, any other methods can be used with equal effect, such as by comparing the input images of two frames at time points $t_0$ and $t_0-1$.

Also, in FIG. 6, the image memory 603, the work memory 604 and the program memory 605 are configured as independent units. Alternatively, the memories 603, 604, 605 may be distributed to one storage unit or a plurality of storage units, or given one of the memories may be distributed among a plurality of storage units.

In the case where the image changed area 1012 is detected in the divided view field areas to be processed, by the image change detection step 202, the process branches to the divided view field end determination step 205 in the division update process branching step 203. In the case where the image changed area 1012 is not detected, on the other hand, the process branches to the reference background image update step 204.

In the reference background image update step 204, the portion of the reference background image 702 corresponding to the divided view field area to be processed by the add-up method of FIG. 8 is updated using the input image at time point t0−1, and the process proceeds to the divided view field area end determination step 205. In the reference background image update step 204, the update rate 804 can be set to a higher level than in the prior art because the absence of the image change in the view field area to be processed is guaranteed by the image change detection step 202 and the division updated process branching step 203. A high update rate involves only a small amount of the update processing from the time of an input image change to the time when the change is updated in the reference background image. In the case where the update rate 804 is reset from 1/64 to 1/4, for example, the update process can be completed only with four frames from the occurrence of an input image change to the updating in the reference background image. Thus the reference background image can be updated within less than one second even when the entering object detection process is executed at the rate of five frames per second. According to this embodiment, the reference background image required for the detection of an entering object can be updated within a shorter time than in the prior art, and therefore an entering object can be positively detected even in a scene where the illuminance of the view field environment undergoes a change.

In the divided view field end determination step 205, it is determined whether the process of the image change detection step 202 to the reference background image division update processing step 204 has been ended for all the divided view field areas. In the case where the process is not ended for all the areas, the process returns to the image change detection step 202 for repeating the process of steps 202 to 205 for the next divided view field area. In the case where the process of the image change detection step 202 to the reference background image division update processing step 205 has been ended for all the divided view field areas, on the other hand, the process returns to the image input step 101, and the series of process of steps 101 to 205 is started from the next image input. Of course, after the divided view field end determination step 205 or in the image input step 101, the process may be delayed a predetermined time thereby to adjust the processing time for each frame to be processed.

In the embodiment described above, the view field is divided into a plurality of areas in the view field dividing step 201, and the reference background image is updated independently for each divided view field area in the reference background image division update processing step 204. Even in the case where an image change has occurred in a portion of the view field, therefore, the reference background image can be updated in the divided view field areas other than the changed area. Also, it is possible to easily specify the place of mismatch of the intensity value between pixels updated and not updated which occurs only in the boundary of divided view field areas which are preset in the reference background image updated by the dynamic area updating method. As a result, the reference background image required for detecting entering objects can be updated within a short time, and even in a scene where the illuminance of the view field areas suddenly changes, an entering object can be accurately detected.

Figure 2:
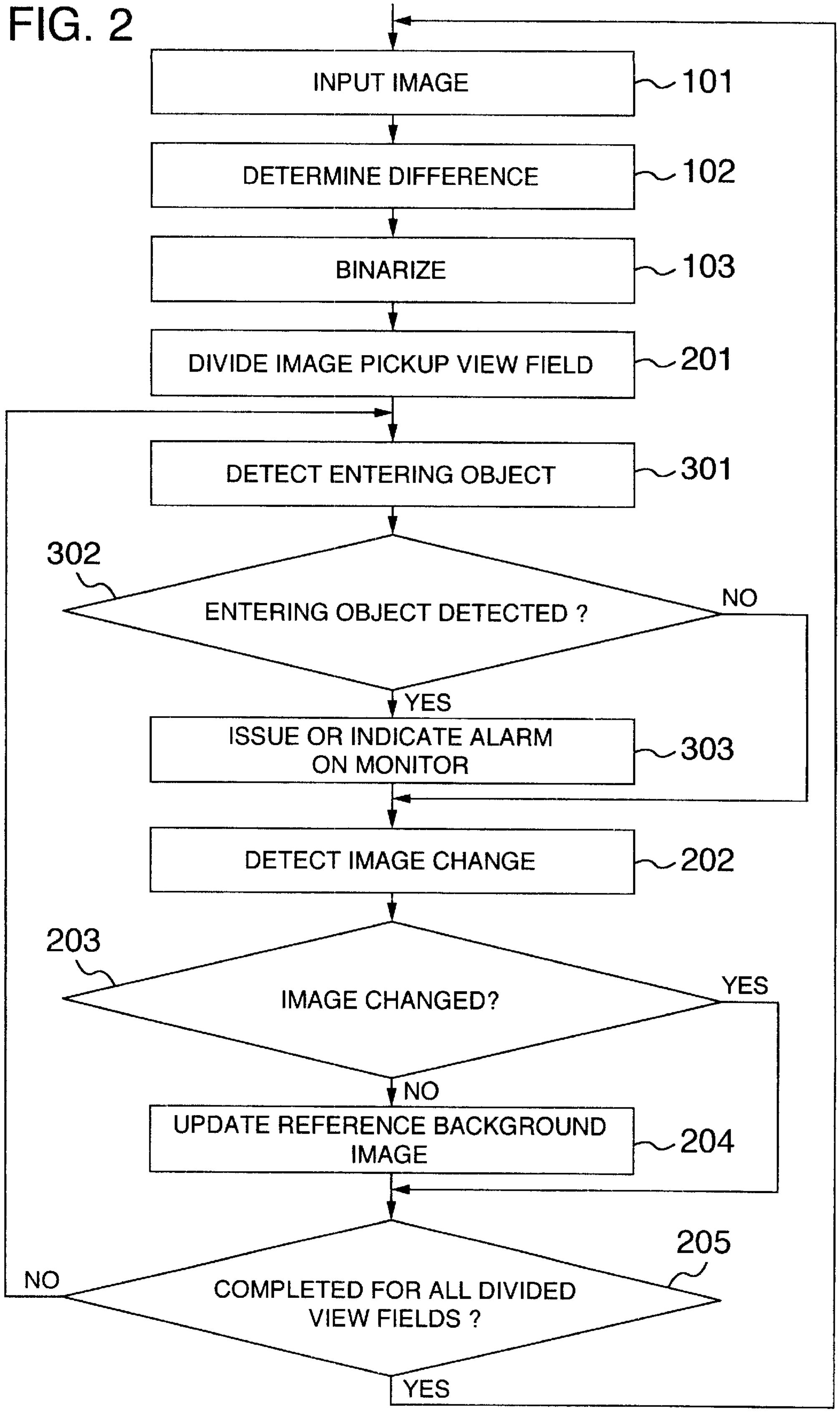
FIG. 2 is a flowchart for explaining the process of updating a reference background image and executing the process for detecting an entering object according to another embodiment of the invention.

Another embodiment of the invention will be explained with reference to FIG. 2. In this embodiment, the view field is divided into a plurality of areas and the entering object detection process is executed for each divided view field area. FIG. 2 is a flowchart for explaining the process of updating the reference background image and detecting an entering object according to this embodiment of the invention. In this flowchart, the view field dividing step 201 in the flowchart of FIG. 1 is executed before detection of an entering object, i.e. after the binarization step 103. Further, the entering object detection processing step 104 is replaced by a divided view field area detection step 301 for detecting an entering object in each divided view field area, the alarm/monitor branching step 105 is replaced by a divided view field area alarm/monitor branching step 302 for determining the presence or absence of an entering object for each divided view field area, and the alarm/monitor indication step 106 is replaced by a divided view field area alarm/monitor indication step 303 for issuing or indicating an alarm on a monitor for each divided view field area. The divided view field areas covered by the divided view field area detection step 301, the divided view field area alarm/monitor branching step 302 and the alarm/monitor indication step 303 are derived from the view field area dividing step 201 for dividing the view field covered by the entering object detection processing step 104, the alarm/monitor branching step 105 and the alarm/monitor indication step 106, respectively.

As described above, according to this invention, the reference background image is updated for each divided view field area independently, and therefore the mismatch described above can be avoided in each divided view field area. Also, since the brightness mismatch occurs in the known boundary of divided view field areas in the reference background image, an image memory of small capacity can be used and further it can be easily determined from the location of a mismatch whether pixels that are detected are caused by the mismatch or really correspond to an entering object, so that the mismatch poses no problem in object detection. In other words, the detection error (the error of the detected shape, the error in the number of detected objects, etc.) which otherwise might be caused by the intensity mismatch between the pixel for which the reference background image can be updated and the pixel for which the reference background image cannot be updated can be prevented and an entering object can be accurately detected.

Figure 3A:
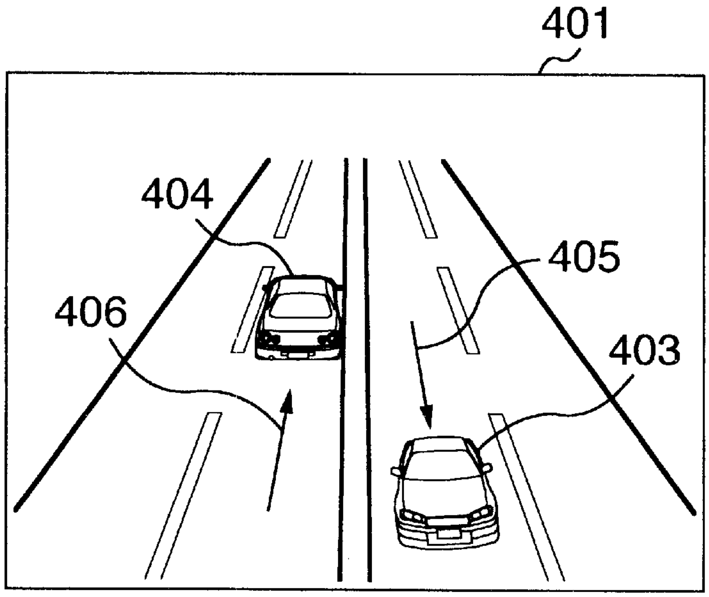
FIGS. 3A, 3B are diagrams useful for explaining an example of dividing the view field according to the invention.
Figure 3B:
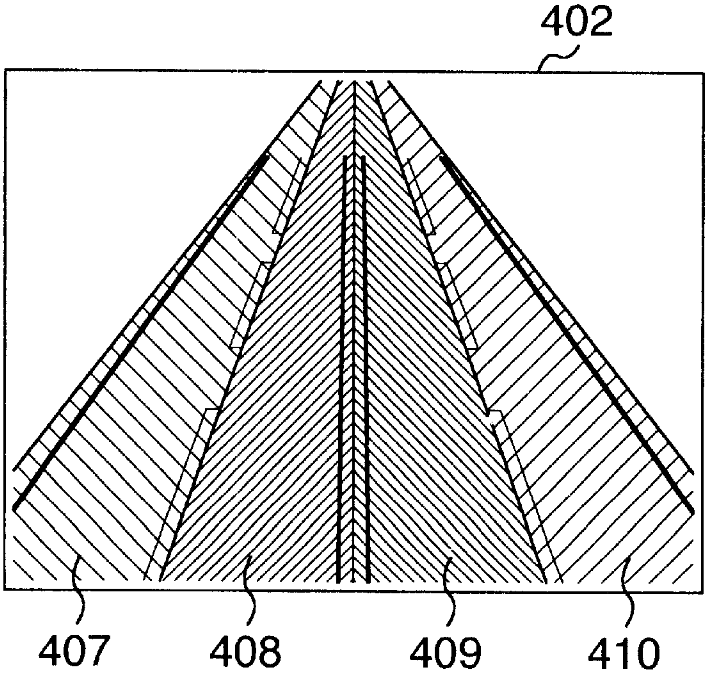

Still another embodiment of the invention will be explained with reference to FIGS. 3A, 3B. FIG. 3A shows an example of a lane image caught in the image pickup view field of the TV camera 601, and FIG. 3B shows an example of division of the view field. In this example, the view field is divided based on the average direction of movement of entering objects measured in advance in the view field dividing step 201 of the flowchart of FIG. 2, in which the objects to be detected by monitoring a road are automotive vehicles. Numeral 401 designates a view field, numeral 402 a view field area, numerals 403, 404 vehicles passing through the view field 401, numerals 405, 406 arrows indicating the average direction of movement, and numerals 407, 408, 409, 410 divided areas.

Figure 11A:
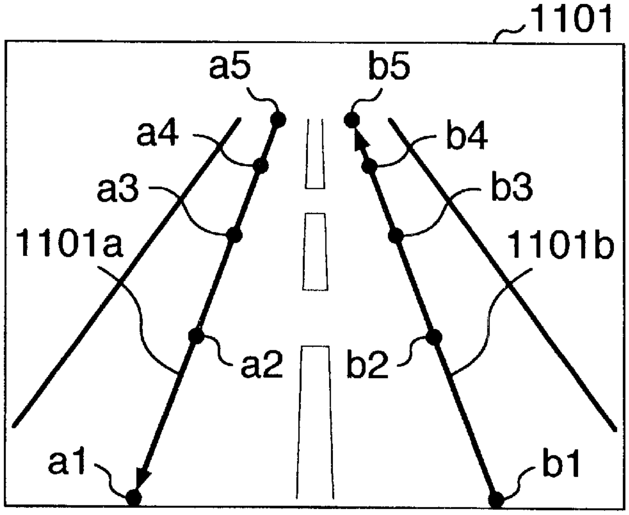
FIGS. 11A to 11C are diagrams useful for explaining the view field dividing method of FIGS. 3A, 3B in detail.
Figure 11B:
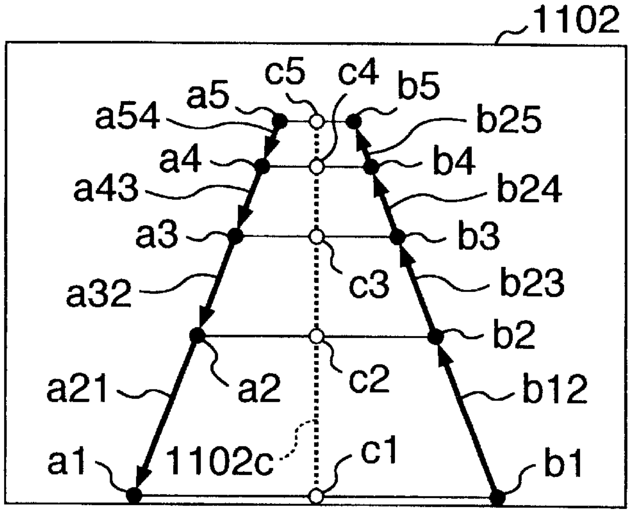
Figure 11C:
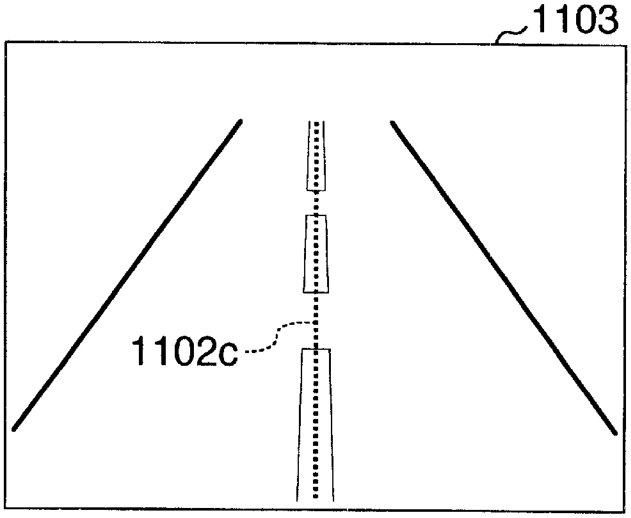

In FIG. 3A, the average direction of movement of the vehicles 403, 404 passing through the view field 401 is as shown by arrows 405, 406, respectively. This average direction of movement can be measured in advance at the time of installing the image monitoring system. According to this invention, the view field is divided in parallel to the average direction of movement, as explained below with reference to FIGS. 11A to 11C. Numeral 1101 designates an example of the view field divided into a plurality of view field areas, in which paths 1101*a*, 1101*b* of movement of the object to be detected obtained when setting the monitoring view field are indicated in overlapped relation. The time taken by an object entering the view field before leaving the view field along the path 1101*a* is divided into a predetermined number (four, in this example) of equal parts, and the position of the object at each time point is expressed as a1, a2, a3, a4, a5 (the coordinate of each position is expressed by $(X_{a1}, Y_{a1})$ for a1, for example). Also, the vectors of each section are expressed as a21, a32, a43, a54 (anm represents a vector connecting a position an and a position am). In similar fashion, the time taken by an object entering the view field before leaving the view field by plotting the path 1101*b* is divided into a predetermined number of equal parts, and the position of the object at each time point is expressed as b1, b2, b3, b4, b5 (the coordinate of each position is expressed as $(X_{b1}, Y_{b1})$ for b1, for example). The vector of each section is given as b12, b23, b34, b45 (bnm indicates a vector connecting a position bn and a position bm). Thus, the vector of each section indicates the average direction of movement. Also, the intermediate points between the positions a1 and b1, the positions a2 and b2, the positions a3 and b3, the positions a4 and b4 and the positions a5 and b5 are expressed as c1, c2, c3, c4, c5, respectively, (the coordinate of each position is expressed as $(X_{c1}, Y_{c1})$ for c1, for example). In other words, $X_{c1}=(X_{a1}+X_{b1})/2$, $Y_{C1}=(Y_{a1}+Y_{b1})/2$(i: 1 to 5). The line 1102*c* connecting the points ci thus obtained is assumed to be a line dividing the view field (1102). Thus, the view field is divided as shown by 1103. Also, even in the case where there are not less than three routes of movement of objects, the moving paths of the objects following adjacent routes are determined in the same manner as in the case of FIGS. 11A to 11C.

In the case of the view field 401, for example, as shown by the view field area 402, the image pickup view field is divided into areas 407, 408, 409, 410 by lanes. Entering objects can be detected and the reference background image can be updated for each of the divided view field areas. Therefore, even when an entering object exists in one divided view field area (lane) and the reference background image of the divided view field area of the particular lane cannot be updated, the reference background image can be updated in other divided view field areas (lanes). Thus, even when an entering object is detected in a view field area, the reference background image required for the entering object detection process in other divided view field areas can be updated within a shorter time than in the prior art shown in FIG. 2. In this way, even on a scene where the illuminance of the view field area undergoes a change, an entering object can be accurately detected.

Figure 4A:
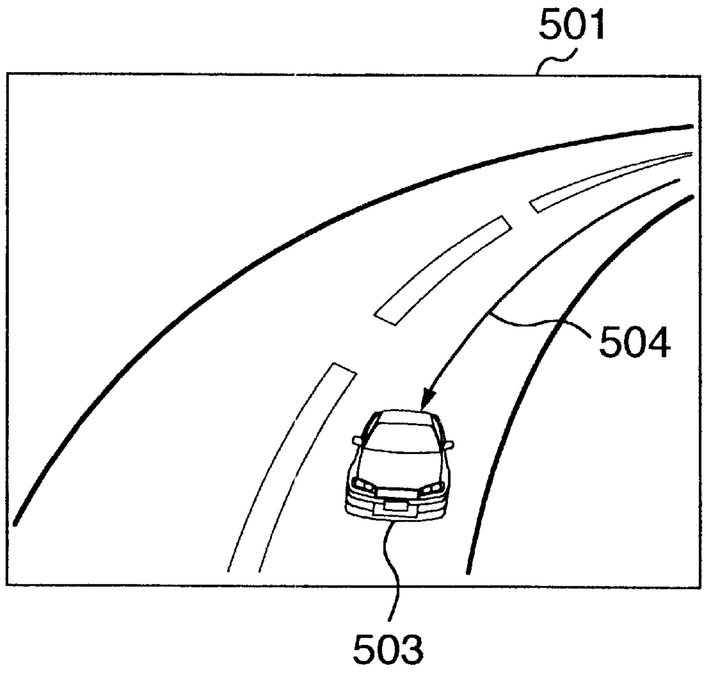
FIGS. 4A, 4B are diagrams useful for explaining an example of dividing the view field according to the invention.
Figure 4B:
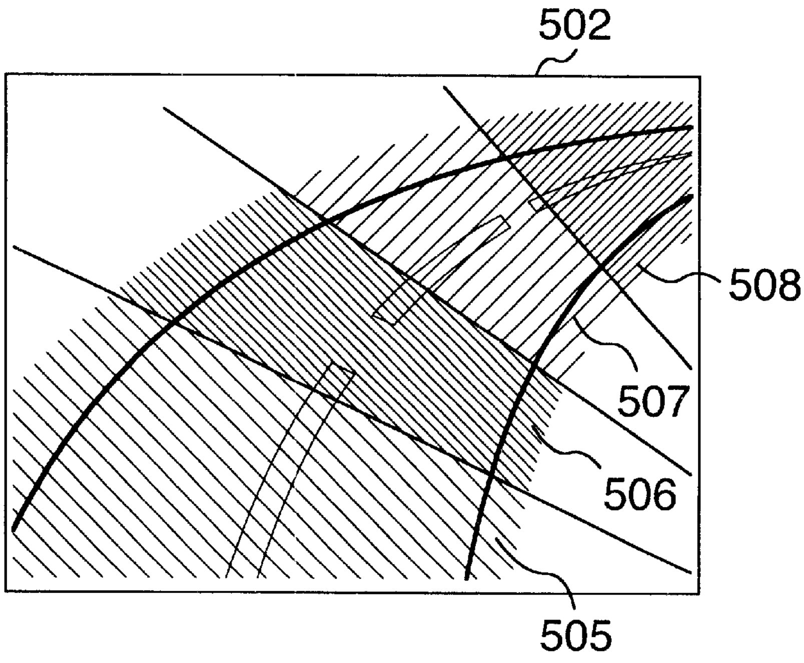

A further embodiment of the invention will be explained with reference to FIGS. 4A, 4B. FIG. 4A shows an example of a lane image caught in the image pickup view field of the TV camera 601, and FIG. 4B shows an example division of the view field). This embodiment represents an example in which the view field is divided in the view field dividing step 201 of the flowchart of FIG. 2, based on the average distance coverage of an entering object measured in advance, and the object to be detected by monitoring a road is assumed to be a vehicle. Numeral 501 is a view field, numeral 502 a view field area, numeral 503 a vehicle passing through the view field 501, numeral 504 an arrow indicating the average distance coverage, and numerals 505, 506, 507, 508 divided areas.

Figure 12A:
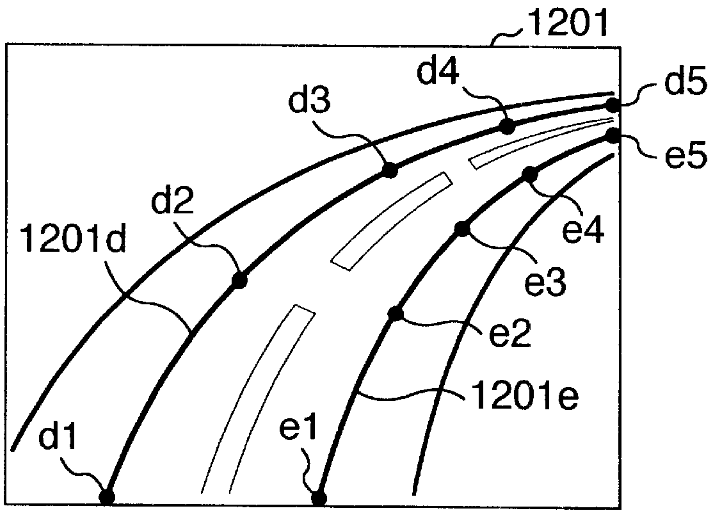
FIGS. 12A to 12C are diagrams useful for explaining the view field dividing method of FIGS. 4A, 4B in detail.
Figure 12B:
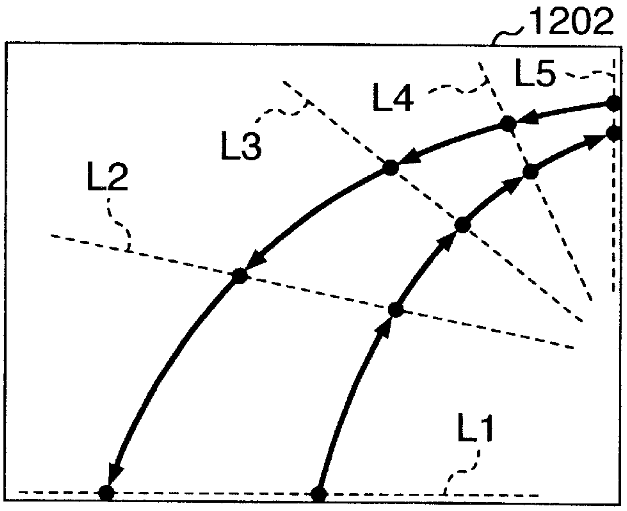
Figure 12C:
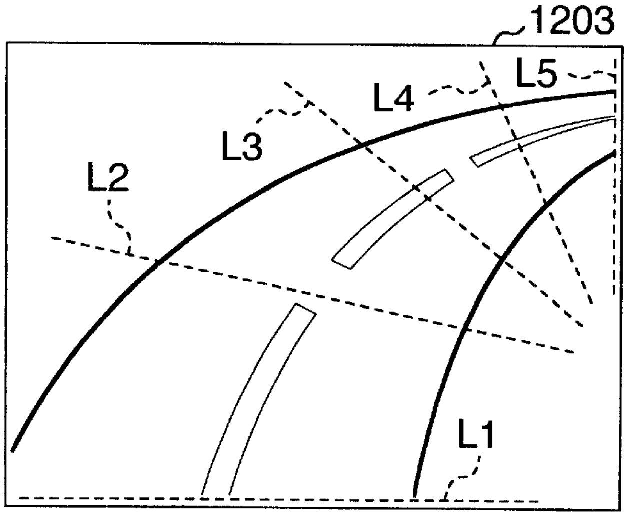

In FIG. 4A, the moving path of the vehicle 503 passing through the view field 501 is indicated by arrow 504. This moving path can be measured in advance at the time of installing an image monitoring system. According to this invention, the view field is divided into equal parts by an average distance coverage based on object moving paths so that the time taken for the vehicle to pass through each divided area is constant. This will be explained with reference to FIGS. 12A, 12B and 12C. Numeral 1201 in FIG. 12A designates an example of the view field area to be divided, in which moving paths 1201*d* and 1201*e* of objects obtained when setting a monitoring view field are shown in overlapped relation. The time required for the entering object plotting the moving path 1201*d* before leaving the view field is divided into a predetermined number (four in this case) of equal parts, and the position of the object at each time point is expressed as d1, d2, d3, d4, d5 (the coordinate of each position is expressed as $(X_{d1}, Y_{d1})$ for d1, for example). In similar fashion, the time required for the entering object plotting the moving path 1201*e* before leaving the view field is divided into a predetermined number of equal parts, and the position of the object at each time point is expressed as e1, e2, e3, e4, e5 (the coordinate of each position is expressed as $(X_{e1}, Y_{e1})$ for e1, for example). Then, the displacement of each position represents the average moving distance range. The straight lines connecting positions d1 and e1, positions d2 and e2, positions d3 and e3, positions d4 and e4 and positions d5 and e5 are expressed as L1, L2, L3, L4, L5, respectively. In other words, the relation $Li: y=(y_{ei}-y_{di})/(x_{ei}-x_{d})\times(x-x_{di})+y_{di}$(i: 1 to 5) is assumed, where each value Li obtained is assumed as a line dividing the view field (1202). Thus, the view field is divided as shown by 1203. Also when three of more routes of movement of an object exist, a set of routes is arbitrarily selected and the divided areas can be determined in a manner similar to the example shown in FIGS. 12A to 12C.

In the example of the view field 501, as shown in the view field area 502, the image pickup view field area 501 is divided into four areas 505, 506, 507, 508. However, the view field can be divided into other than four areas. An entering object is detected and the reference background image is updated for each divided view field area. Thus, even in the case where an entering object exists in one lane, the entering object detection process can be executed in the divided view field areas other than the area where the entering object exists. The divided areas can be indicated by different colors on the screen of the monitor 611. Further, the boundaries between the divided areas may be displayed on the screen. This is of course also the case with the embodiments of FIGS. 3A, 3B.

Also, when monitoring other than a road, such as a harbor, the view field can be divided in accordance with the time where an object stays in a particular area where the direction or moving distance of a ship in motion can be specified, such as at the entrance of a port, a wharf, a canal or straits.

As described above, even when an entering object is detected in a view field area, the reference background image required for the entering object detection process in other divided view field areas can be updated within a shorter time than in the prior art shown in FIG. 1. Thus, an entering object can be accurately detected even in a scene where the illuminance changes in a view field area.

In other embodiments of the invention, the view field is divided by combining the average direction of movement and the average moving distance as described with reference to FIGS. 3A, 3B, 4A, 4B. Specifically, in the embodiment of FIG. 3, the reference background image cannot be updated in a particular lane where an entering object exists. Also, in the embodiment of FIG. 4, in the case where an entering object exists in an area or segment of the road, the reference background image cannot be updated for the area or segment. By dividing the view field into several lanes and several areas, however, the entering object detection process can be executed in divided view field areas other than the lane or the segment where the entering object exists. As a result, even in the case where an entering object is detected in a given view field area, the reference background image required for the entering object detection process can be updated in a shorter time than in the prior art in other than the divided view field area where the particular entering object exists. In this way, an entering object can be accurately detected even in a scene where the illuminance of the view field environment changes.

As described above, according to this invention, even in the case where an entering object is detected in a view field area, the reference background image required for the entering object detection process in other than the divided view field area where the particular entering object exists can be updated in a shorter time than when updating the reference background image by the conventional add-up method. Further, the brightness mismatch between pixels that can be updated and pixels in the divided view field areas that cannot be updated can be prevented unlike in the conventional dynamic area updating method. Thus, an entering object can be accurately detected even in a scene where the illuminance of the view field environment undergoes a change.

It will thus be understood from the foregoing description that according to this embodiment, the reference background image can be updated in accordance with the brightness change of the input image within a shorter time than in the prior art using an image memory of a fewer capacity. Further, unlike in the prior art, the intensity mismatch between pixels for which the reference background image can be updated and pixels for which the reference background image cannot be updated is obviated by regarding them to be located at a specific place such as the boundary line between the divided view field areas. It is thus possible to detect only an entering object accurately and reliably, thereby widening the application of the entering object detecting system considerably while at the same time reducing the capacity of the image memory.

The method for updating the reference background image and the method for detecting entering objects according to the invention described above can be executed as a software product such as a program realized on a computer readable medium.

What is claimed is:

1. A method of updating a reference background image for use in detecting an object entering an image pickup view field of an image pickup device based on a difference between an input image from said image pickup device and a reference background image of said input image, comprising the steps of:

displaying said image pickup view field on a display;

dividing said image pickup view field into a plurality of view field areas based on at least one of predetermined position information and time information of said image pickup view field displayed on said display;

detecting whether said object from said input image exists with each of said divided view field areas; and updating divided view field areas of the reference background image in which said object is not detected.

2. A method according to claim 1, wherein said detecting step includes the step of detecting a movement of said object.

3. A method according to claim 1, wherein said predetermined position information is one or more boundary lines substantially parallel to the direction of movement of said object.

4. A method according to claim 1, wherein said predetermined position information is information relating to the average movement range of said object.

5. A method according to claim 1, wherein said predetermined position information is one or more boundary lines substantially parallel to the direction of movement of said object, said method further comprising the step of:

sub-dividing each of said divided new field areas based on information relating to the average movement range of said object.

6. A method according to claim 1, further comprising the step of:

displaying the boundary of said divided view field areas on said display in different colors.

7. A method according to claim 3, wherein said object is a vehicle moving on a road and said boundary lines is that of a roadway.

8. A system for updating a reference background image for use in detecting an object entering an image pickup view field based on a difference between an input image and a reference background image of said input image, said system comprising:

an image pickup device for generating said input image;

a processing unit coupled with said image pickup device for processing said input image to detect said object; and a display unit coupled with said processing unit on which said image pickup view field is displayed, wherein said processing unit comprises:

a dividing unit for dividing said image pickup view field into a plurality of view field areas based on at least one of predetermined position information and time information of said image pickup view field displayed on said display, a detecting unit for detecting whether said object from said input image exists within each of said divided view field areas, and an updating unit for updating divided view field areas of the reference background image in which said object is not detected.

9. A system according to claim 8, wherein at least one of said predetermined position information and time information is either one of average value of movement of said object and distance covered by said object for a predetermined unit of time.

10. A system according to claim 8, wherein said updating unit comprises:

an image change detection unit for detecting a change of said input image within each of said divided view field areas; and a background image updating unit for updating part of said reference background image corresponding to each of said divided view field areas in which said object is not detected.

11. A computer readable medium having program code means executable by a computer embodied therein for detecting an object in an image pickup view field based on a difference between an input image and a reference background image of said input image, comprising:

first code means for displaying said image pickup view field on a display;

second code means for dividing said image pickup view field into a plurality of view field areas based on at least one of predetermined position information and time information of said image pickup view field displayed on said display;

third code means for detecting whether said object from said input image exists within each of said divided view field areas; and fourth code means for updating divided view field areas of the reference background image in which said object is not detected.

12. A computer readable medium according to claim 11, wherein said fourth code means comprises:

fifth code means for detecting a change of said input image within each of said divided view field areas; and sixth code means for updating part of said reference background image corresponding to each of said divided view field areas in which said object is not detected.

13. A method of updating a reference background image for use in detecting an object entering an image pickup view field of an image pickup device based on a difference between an input image from said image pickup device and a reference background image of said input image, comprising the steps of:

displaying said image pickup view field on a display;

dividing said image pickup view field into a plurality of view field areas based on at least one of predetermined position information and time information of said image pickup view field displayed on said display;

detecting whether said object from said input image exists within each of said divided view field areas; and updating each of said divided view field areas of the reference background image in which said object is not detected in order to detect a next entering object.

14. A method according to claim 13, wherein said updating step comprises the steps of:

detecting a change of the image signal of an input image portion corresponding to each of said divided view field areas; and updating a portion of said reference background image corresponding to each of said divided view areas corresponding to said input image portion in which said object is not detected.

15. A method according to claim 13, wherein said change of said image signal is movement of said object.

16. A method according to claim 13, wherein said dividing step comprises the step of:

dividing said image pickup view field by one or more boundary lines substantially parallel to the direction of movement of said object.

17. A method according to claim 13, wherein said dividing step comprises the step of:

dividing said image pickup view field by an average movement range of said object during a predetermined unit time.

18. A method according to claim 13, wherein said dividing step comprises the step of:

dividing said view field by one or more boundary lines substantially parallel to the direction of movement of said object, and sub-dividing said divided view field by an average movement range of said object during each predetermined unit time.

19. A method according to claim 13, wherein said input image includes at least a lane, and said dividing step comprises the step of:

dividing said image pickup view field by one or more lane boundaries.

20. A method according to claim 13, wherein said input image includes a lane, and said dividing step comprises the step of:

dividing said image pickup view field by an average movement range of a vehicle during a predetermined unit time.

21. A method according to claim 13, wherein said input image includes a lane, and said dividing step comprises the step of:

dividing said image pickup view field by one or more lane boundaries, and sub-dividing said divided image pickup view field by an average movement range of the vehicle during a predetermined unit of time.

22. A method according to claim 13, wherein said dividing step divides said image pickup view field into a plurality of view field areas based on at least one of the average direction of movement of said object and the distance covered by said entering object during a predetermined unit of time.

* * * * *